(12) United States Patent
Tanaka

(10) Patent No.: US 9,793,558 B2
(45) Date of Patent: Oct. 17, 2017

(54) FUEL CELL SYSTEM

(75) Inventor: Michihito Tanaka, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 247 days.

(21) Appl. No.: 14/390,586

(22) PCT Filed: Apr. 6, 2012

(86) PCT No.: PCT/JP2012/059564
§ 371 (c)(1),
(2), (4) Date: Jan. 14, 2015

(87) PCT Pub. No.: WO2013/150651
PCT Pub. Date: Oct. 10, 2013

(65) Prior Publication Data
US 2015/0171444 A1 Jun. 18, 2015

(51) Int. Cl.
H01M 8/04291 (2016.01)
H01M 8/04828 (2016.01)
H01M 8/04537 (2016.01)
H01M 8/04746 (2016.01)
H01M 8/04089 (2016.01)
H01M 8/04492 (2016.01)
H01M 8/04119 (2016.01)
H01M 8/1018 (2016.01)

(52) U.S. Cl.
CPC ..... *H01M 8/04291* (2013.01); *H01M 8/0485* (2013.01); *H01M 8/04104* (2013.01); *H01M 8/04492* (2013.01); *H01M 8/04552* (2013.01); *H01M 8/04559* (2013.01); *H01M 8/04753* (2013.01); *H01M 8/04828* (2013.01); *H01M 8/04119* (2013.01); *H01M 2008/1095* (2013.01)

(58) Field of Classification Search
CPC ......... H01M 8/04291; H01M 8/04828; H01M 8/04492; H01M 8/04452; H01M 8/04573; H01M 8/04559; H01M 2008/1095
See application file for complete search history.

(56) References Cited

U.S. PATENT DOCUMENTS 7,670,700 B2 * 3/2010 Imamura ............. B60L 11/1881
205/337

FOREIGN PATENT DOCUMENTS

JP 2010-244937 A 10/2010

* cited by examiner

Primary Examiner — Ula C Ruddock
Assistant Examiner — Thomas Parsons
(74) Attorney, Agent, or Firm — Andrews Kurth Kenyon LLP

(57) ABSTRACT

A fuel cell system of the present invention can suppress an excessively wet or dry state of a fuel cell stack so as to thereby ensure the durability of the fuel cell stack. The fuel cell system supplies an oxidant gas with a reduced flow rate per unit time and for a long time period if the rate of voltage decrease of the stack becomes faster than a threshold rate, and supplies the oxidant gas with an increased flow rate per unit time and for a short time period if the rate of voltage decrease becomes slower than a threshold rate.

6 Claims, 3 Drawing Sheets

FUEL CELL SYSTEM

CROSS-REFERENCE TO RELATED APPLICATIONS

This is a national phase application based on the PCT International Patent Application No. PCT/JP2012/059564 filed Apr. 6, 2012, the entire contents of which are incorporated herein by reference.

TECHNICAL FIELD

The present invention relates to a fuel cell system.

BACKGROUND ART

A fuel cell stack which constitutes a fuel cell system oxidizes a fuel through an electrochemical process to thereby directly convert energy released due to such oxidization reaction into electric energy. Such fuel cell stack has a membrane-electrode assembly in which a polymer electrolyte membrane, which selectively transports hydrogen ions, is sandwiched by a pair of electrodes made of porous materials. Each of the pair of electrodes includes: a catalyst layer that contains, as a main ingredient, carbon powder supporting a platinum-based metal catalyst, and that contacts with the polymer electrolyte membrane; and a gas diffusion layer formed on a surface of the catalyst layer, the gas diffusion layer having both air permeability and electronic conductivity.

In a fuel cell vehicle in which such fuel cell system is installed as an electric power source, operation in a high-output zone with a high power generation efficiency is controlled such that the fuel cell stack is operated to generate electric power so as to supply electric power to a traction motor from both the fuel cell stack and a secondary battery or from the fuel cell stack alone, while operation in a low-output zone with a low power generation efficiency is controlled such that power generation by the fuel cell stack is temporarily stopped and electric power is supplied to the traction motor only from the secondary battery. Temporarily stopping the operation of the fuel cell stack in a low-load zone with a low power generation efficiency of the fuel cell system, as described above, is called an "intermittent operation". By performing such intermittent operation in a low-load zone with a reduced power generation efficiency of the fuel cell system, the fuel cell stack can be operated within a range with a high energy conversion efficiency and the efficiency of the fuel cell system as a whole can be enhanced.

Among fuel cell systems that perform such intermittent operation, a known system performs an intermittent operation if a load which is requested to be covered by the fuel cell stack is equal to or lower than a predetermined value. When the fuel cell stack in this fuel cell system is shifted to a power generation stop state as a result of performing an intermittent operation, and if the cell voltage of the fuel cell stack decreases below a predetermined value, the fuel cell system drives an air compressor to supply oxygen gas to the fuel cell stack, in order to recover the cell voltage by solving the shortage of oxygen in the cathode of the fuel cell stack, so as to thereby improve the delay of a response to a power generation request.

In the above-described intermittent operation, the supply of reactant gases to the fuel cell stack is stopped and a command voltage for a DC/DC converter which is connected in parallel to the output terminal of the fuel cell stack is set to an open circuit voltage (OCV) so that the output terminal voltage of the fuel cell stack is controlled to a high-potential avoidance voltage which is a voltage smaller than the open circuit voltage. By maintaining the output terminal voltage of the fuel cell stack at the high-potential avoidance voltage which is smaller than the open circuit voltage, it is possible to control the current flowing out from the fuel cell stack during the intermittent operation.

In the conventional intermittent operation, in order to ensure output responsiveness while maintaining the output terminal voltage of the fuel cell stack at the high-potential avoidance voltage or lower, air blowing control which drives an air compressor to blow in a large amount of air is performed if the output terminal voltage decreases to a predetermined threshold or lower. However, when such air blowing control is performed, the output terminal voltage will increase and exceed the open circuit voltage (OCV), and it is thus necessary to suppress such increase in voltage by driving the DC/DC converter so as to cause the fuel cell stack to generate electric power. Since this power generation is performed for the purpose of maintaining the output terminal voltage at a value equal to or lower than the high-potential avoidance voltage, it is preferable to avoid performing such power generation in view of the efficiency of the entire fuel cell system. Under these circumstances, Patent Document 1, indicated below, describes a fuel cell system capable of suppressing unnecessary power generation by the fuel cell stack while performing high-potential avoidance control during the intermittent operation.

The fuel cell system described in Patent Document 1 has: fuel gas supply means that supplies a fuel gas to an anode; oxidant gas supply means that supplies an oxidant gas to a cathode; and control means that controls the fuel gas supply means and the oxidant gas supply means and causes a fuel cell stack to perform power generation in response to a required power. The control means monitors an output terminal voltage of the fuel cell stack during an intermittent operation so that the output terminal voltage is equal to or lower than an upper limit voltage for the intermittent operation and is equal to or greater than a lower limit voltage for the intermittent operation, and, based on the result of the monitoring, controls the supply of the oxidant gas in such a manner that a small amount of oxidant gas is supplied continuously.

PRIOR ART REFERENCE

Patent Document

Patent Document 1: JP2010-244937 A

SUMMARY OF THE INVENTION

Problem to be Solved by the Invention

With the progress in developing simpler fuel cell systems that require lower cost, it has become necessary to respond to a high-temperature condition without humidification, and electrolyte membranes are becoming thinner. Further, since no moisture is supplied from the outside, the need for humidification through self-power generation is increasing. In such fuel cell systems in which moisture control is required to be performed more accurately, if the fuel cell stack is dry or wet excessively during an intermittent operation, this may be an impediment to ensuring a certain output when the intermittent operation is shifted to a normal operation.

The present invention has been made in view of the above-described problems and an object of the present invention is to provide a fuel cell system that can suppress an excessively wet or dry state of a fuel cell stack so as to thereby ensure the durability of the fuel cell stack.

Means for Solving the Problem

In order to achieve the above object, a fuel cell system according to the present invention comprises: a fuel cell stack including a plurality of unit cells, each having an anode and a cathode; fuel gas supply means that supplies a fuel gas to the anode; oxidant gas supply means that supplies an oxidant gas to the cathode; state detection means that detects a dry/wet state of the unit cell; and control means that controls the fuel gas supply means and the oxidant gas supply means so that power generation is performed by the fuel cell stack in response to a required electric power and that also controls the fuel gas supply means and the oxidant gas supply means based on a result of detection by the state detection means. When the required electric power is equal to or lower than a predetermined value and when an intermittent operation is being performed in which the power generation by the fuel cell stack is suppressed, the control means monitors an output terminal voltage of the fuel cell stack so that the output terminal voltage has a value which is equal to or lower than an upper limit voltage for the intermittent operation and is equal to or greater than a lower limit voltage for the intermittent operation, and supplies the oxidant gas based on a result of the monitoring. Further, the control means is allowed to perform an output ensuring mode in which the oxidant gas is supplied with a reduced flow rate per unit time and for a long time period if the unit cell is determined as being in a wet state, while the oxidant gas is supplied with an increased flow rate per unit time and for a short time period if the unit cell is determined as being in a dry state.

The present invention utilizes the fact that the rate of voltage decrease of the fuel cell stack indicates how wet the anode constituting the unit cell is. If the anode becomes wet, the polymer membrane that constitutes the anode and cathode will loosen and cross leakage will be likely to occur. Accordingly, if the unit cell is determined as being in a wet state, the oxidant gas is supplied with a reduced flow rate per unit time and for a long time period so that the wet state is shifted to a dry state. If the unit cell is determined as being in a dry state, the oxidant gas is supplied with an increased flow rate per unit time and for a short time period so that the dry state is shifted to a wet state.

In the fuel cell system according to the present invention, it is preferable: that the state detection means detects the dry/wet state of the unit cell by measuring a rate of voltage decrease, which is a rate of the decrease of the output terminal voltage from the upper limit voltage to the lower limit voltage due to a shortage of oxygen; and that the control means determines that the unit cell is in a wet state if the rate of voltage decrease is equal to or greater than an upper limit threshold rate and determines that the unit cell is in a dry state if the rate of voltage decrease is equal to or lower than a lower limit threshold rate.

Oxygen is consumed at the cathode when the above-described cross leakage proceeds further, and this increases the rate of voltage decrease. Thus, if the rate of voltage decrease is increased excessively, it shows that the anode is too wet, and if the rate of voltage decrease is reduced excessively, it shows that the anode is too dry. In the preferable mode stated above, the anode is determined as becoming wetter if the rate of voltage decrease becomes faster than the upper limit threshold rate, so that the oxidant gas will be supplied with a reduced flow rate per unit time and for a long time period, so as to thereby dry the polymer membrane.

In the fuel cell system according to the present invention, it is also preferable: that the oxidant gas supply means has an air compressor; and that the control means causes the air compressor to rotate inertially for a long time if the unit cell is in a wet state, while the control means forcibly stops the air compressor if the unit cell is in a dry state.

In the preferable mode stated above, the flow rate of the oxidant gas delivered to the unit cell is changed by changing the mode of rotation of the air compressor, and a suitable gas flow can thus be formed according to the wet state of the unit cell.

In the fuel cell system according to the present invention, it is also preferable: that the control means learns the relationship between the rate of voltage decrease and an output of the fuel cell stack generated after the intermittent operation; and that the control means changes the threshold rate for the rate of voltage decrease.

In the preferable mode stated above, the relationship between an output during the operation and the rate of voltage decrease is learned so as to change the threshold rate: As a result, it is possible to easily set the threshold rate according to the change of the fuel cell stack over time.

In the fuel cell system according to the present invention, it is preferable: that the control means monitors transition of the rate of voltage decrease after the output ensuring mode starts being performed; and that the control means corrects the upper limit voltage downward if the rate of voltage decrease does not increase.

In the preferable mode stated above, the upper limit voltage is corrected downward if the rate of voltage decrease does not increase, and accordingly, the fuel cell stack can be put in a wet state.

In order to achieve the object described above, a fuel cell system according to the present invention comprises: a fuel cell stack including a plurality of unit cells, each having an anode and a cathode; fuel gas supply means that supplies a fuel gas to the anode; oxidant gas supply means that supplies an oxidant gas to the cathode; and control means that controls the fuel gas supply means and the oxidant gas supply means so that power generation is performed by the fuel cell stack in response to a required electric power. When the required electric power is equal to or lower than a predetermined value and when an intermittent operation is being performed in which the power generation by the fuel cell stack is suppressed, the control means monitors an output terminal voltage of the fuel cell stack so that the output terminal voltage has a value which is equal to or lower than an upper limit voltage for the intermittent operation and is equal to or greater than a lower limit voltage for the intermittent operation, and supplies the oxidant gas based on a result of the monitoring. Further, the control means measures a rate of voltage decrease from the upper limit voltage to the lower limit voltage due to a shortage of oxygen, and supplies the oxidant gas with a reduced flow rate per unit time and for a long time period if the rate of voltage decrease is equal to or greater than an upper limit threshold rate and supplies the oxidant gas with an increased flow rate per unit time and for a short time period if the rate of voltage decrease is equal to or lower than a lower limit threshold rate.

The present invention utilizes the fact that the rate of voltage decrease of the fuel cell stack indicates how wet the anode constituting the unit cell is. If the anode becomes wet, the polymer membrane that constitutes the anode and cathode will loosen and cross leakage will be likely to occur. If such cross leakage proceeds further, oxygen will be consumed at the cathode and this will increase the rate of voltage decrease. Thus, if the rate of voltage decrease is increased excessively, it shows that the anode is too wet, and if the rate of voltage decrease is reduced excessively, it shows that the anode is too dry. Accordingly, in the present invention, the anode is determined as becoming wetter if the rate of voltage decrease becomes faster than the upper limit threshold rate, so that the oxidant gas will be supplied with a reduced flow rate per unit time and for a long time period, so as to thereby dry the polymer membrane. On the other hand, the anode is determined as becoming drier if the rate of voltage decrease becomes slower than the lower limit threshold rate, so that the oxidant gas will be supplied with an increased flow rate per unit time and for a short time period, so as to thereby facilitate the wetting of the polymer membrane.

EFFECT OF THE INVENTION

According to the present invention, it is possible to provide a fuel cell system that can suppress an excessively wet or dry state of a fuel cell stack so as to thereby ensure the durability of the fuel cell stack.

MODE FOR CARRYING OUT THE INVENTION

Figure 1:
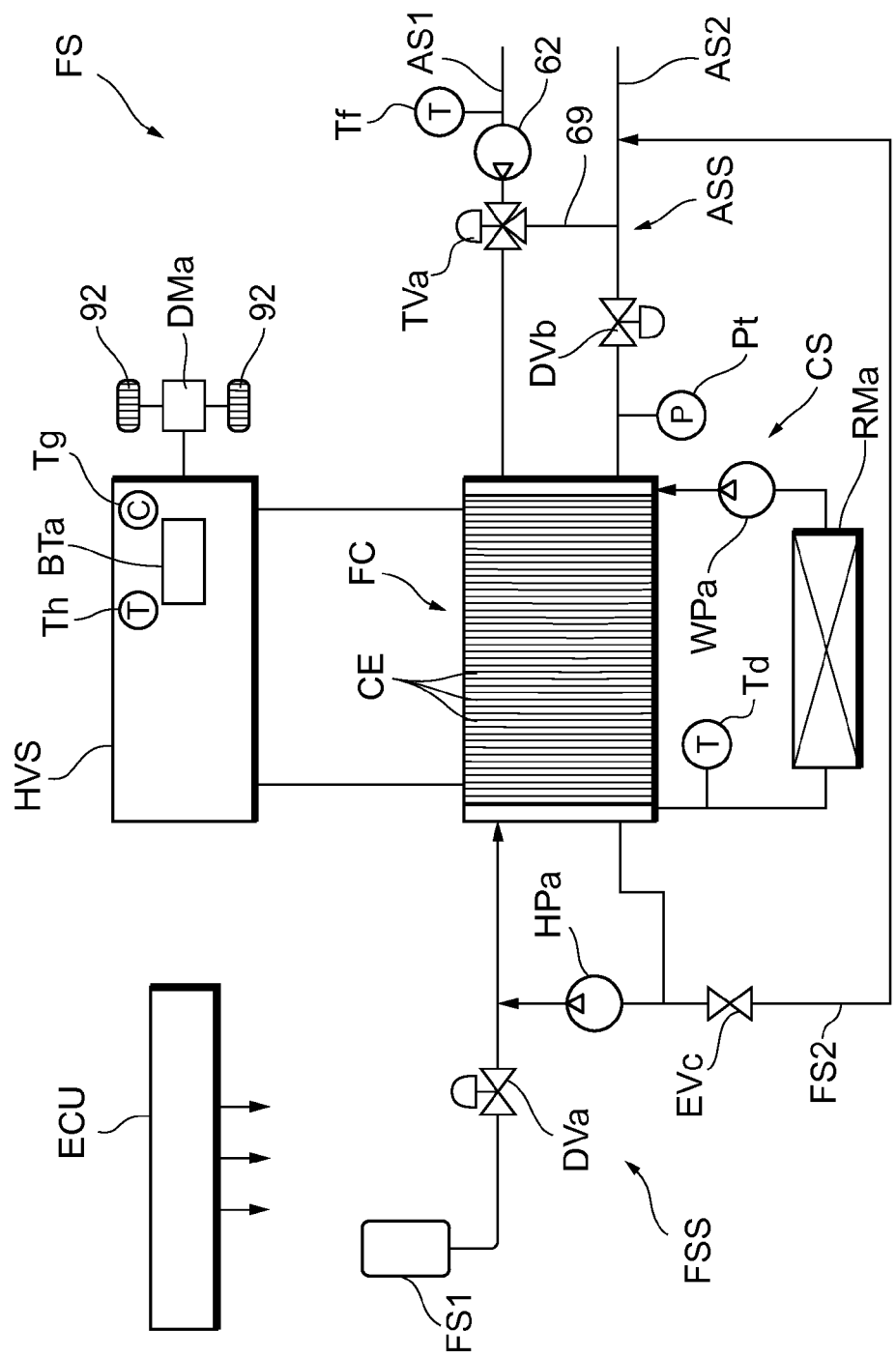
FIG. 1 is a schematic configuration diagram showing the configuration of a fuel cell system according to an embodiment of the present invention.

Embodiments of the present invention will be described below with reference to the attached drawings. In each drawing, to facilitate understanding of the descriptions, the same components will be given the same reference numerals wherever possible and any repetitive descriptions will be omitted.

First, a fuel cell system FS, which is an embodiment of the present invention and is installed in a fuel cell vehicle, will be described by referring to FIG. 1. FIG. 1 is a view showing the system configuration of the fuel cell system FS which functions as an in-vehicle power supply system of a fuel cell vehicle. The fuel cell system FS can be installed in various vehicles, including fuel cell cars (FCHV), electric cars and hybrid cars.

The fuel cell system FS has a fuel cell FC, an oxidant gas supply system ASS, a fuel gas supply system FSS, a drive system HVS and a cooling system CS.

The oxidant gas supply system ASS is a system for supplying air, serving as an oxidant gas, to the fuel cell FC. The fuel gas supply system FSS is a system for supplying hydrogen gas, serving as a fuel gas, to the fuel cell FC. The drive system HVS is a system that drives a drive motor DMa by supplying electric power to the drive motor DMa, and it constitutes a hybrid system. The cooling system CS is a system for cooling the fuel cell FC. The drive motor DMa is a motor that drives wheels 92, 92.

A fuel cell unit FCS will now be described. The fuel cell FC included in the fuel cell unit FCS is structured as a solid polymer electrolyte-type cell stack in which numerous cells CE (each being a single cell (electricity generating element) having an anode, a cathode and an electrolyte) are stacked in series. In the fuel cell FC under a normal operation, the oxidation reaction shown by formula (1) occurs at the anode while the reduction reaction shown by formula (2) occurs at the cathode, and the electrogenic reaction shown by formula (3) occurs in the fuel cell FC as a whole.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

The fuel cell unit FCS also includes a hydrogen pump HPa and a discharge/drain valve EVc in an area where the fuel cell FC is connected to the fuel gas supply system FSS.

The fuel gas supplied to the fuel cell FC contributes to the electrogenic reaction within the fuel cell FC and is discharged from the fuel cell FC as an off-gas. Part of the fuel off-gas discharged from the fuel cell FC is allowed to flow back by the hydrogen pump HPa, so as to be supplied again to the fuel cell FC together with the fuel gas supplied from the fuel gas supply system FSS. Further, with the operation of the discharge/drain valve EVc, part of the fuel off-gas is allowed to flow through a fuel off-gas flow path FS2, so as to be discharged together with an oxidant off-gas.

The discharge/drain valve EVc is a valve which operates under a command from a controller ECU so as to discharge water as well as the impurity-containing fuel off-gas within a circulation flow path, toward the outside. When the discharge/drain valve EVc is opened, the concentration of impurities in the fuel off-gas within the circulation flow path is decreased and, as a result, the concentration of hydrogen in the fuel off-gas flowing through a circulation system can be increased.

The fuel off-gas discharged via the discharge/drain valve EVc is mixed with the oxidant off-gas flowing through an oxidant off-gas flow path AS2 and diluted by a diluter (not expressly shown in FIG. 1) so as to thereby be supplied to a muffler (not expressly shown in FIG. 1).

The fuel gas supply system FSS will be described next. The fuel gas supply system FSS has a high pressure hydrogen tank FS1 and an electromagnetic valve DVa.

The high pressure hydrogen tank FS1 stores hydrogen gas at a high pressure (e.g., 35 MPa to 70 MPa).

The electromagnetic valve DVa is a valve that regulates the pressure of the fuel gas to be supplied to the fuel cell FC and also regulates the supply of the fuel gas to the fuel cell FC and the stop of such supply. The pressure of the fuel gas is reduced by the electromagnetic valve DVa to, for example, around 200 kPa and the fuel gas is thereafter supplied to the fuel cell FC.

The oxidant gas supply system ASS will be described next. The oxidant gas supply system ASS has an air compressor 62, an FC inlet three-way valve TVa and an integrated valve DVb. The oxidant gas supply system ASS also includes an oxidant gas flow path AS1 through which air serving as the oxidant gas to be supplied to the cathode of the fuel cell FC flows, and an oxidant off-gas flow path AS2 through which the oxidant off-gas discharged from the fuel cell FC flows.

The air compressor 62 and the FC inlet three-way valve TVa are arranged in the oxidant gas flow path AS1 in this order from the inlet side of the oxidant gas flow path AS1 toward the fuel cell FC. The integrated valve DVb is arranged in the oxidant off-gas flow path AS2. The integrated valve DVb functions as a backpressure regulating valve.

The FC inlet three-way valve TVa is a valve for regulating the air directed to flow through the oxidant gas flow path AS1 toward the fuel cell FC and the air directed to flow through a bypass flow path 69 which connects the oxidant gas flow path AS1 and the oxidant off-gas flow path AS2. If a large amount of air is necessary in the fuel cell FC, the opening degree of the FC inlet three-way valve TVa is regulated so that a larger amount of air is allowed to flow toward the fuel cell FC, and if the fuel cell FC does not require so much air, the opening degree of the FC inlet three-way valve TVa is regulated so that a larger amount of air is allowed to flow toward the bypass flow path 69. A pressure sensor Pt is provided between the fuel cell FC and the integrated valve DVb.

The drive system HVS will be described next. The drive system HVS has a fuel cell voltage-increasing part, a power control unit and a secondary battery BTa. The fuel cell voltage-increasing part has a fuel cell voltage-increasing converter (output supply part) and a relay. The fuel cell voltage-increasing converter increases the voltage of direct-current power generated by the fuel cell FC and supplies the resulting power to the power control unit. With this voltage conversion control by the voltage-increasing converter, the operating point (the output terminal voltage and output current) of the fuel cell FC can be controlled.

The power control unit has a battery voltage-increasing converter and a traction inverter. The power supplied from the fuel cell voltage-increasing converter is supplied to the battery voltage-increasing converter and the traction inverter.

The battery voltage-increasing converter has a function of increasing the voltage of direct-current power supplied from the secondary battery BTa and outputting the resulting power to the traction inverter, and a function of decreasing the voltage of direct-current power generated by the fuel cell FC or the voltage of regenerative power collected by the drive motor DMa as a result of regenerative braking, in order to charge the secondary battery BTa with the resulting power.

The secondary battery BTa functions as: a storage source for excess electric power; a storage source for regenerative energy during a regenerative braking operation; or an energy buffer provided for a load change resulting from acceleration or deceleration of the fuel cell vehicle. Secondary batteries, such as nickel-cadmium batteries, nickel-hydrogen batteries and lithium secondary batteries, etc., may be suitably used for the secondary battery BTa. An SOC sensor Tg which determines the rate of charge is attached to the secondary battery BTa.

The traction inverter is connected to the drive motor DMa. The traction inverter may be, for example, a PWM inverter driven by pulse width modulation. The traction inverter converts a direct-current voltage output from the fuel cell FC or the secondary battery BTa to a three-phase alternating current voltage in accordance with a control command provided by the controller ECU and controls the rotation torque of the drive motor DMa. The drive motor DMa may be, for example, a three-phase alternating current motor which constitutes a power source of the fuel cell vehicle.

The cooling system CS will be described next. The cooling system CS has a main radiator RMa and a water pump WPa.

The main radiator RMa is provided with a main radiator fan. The main radiator RMa allows a coolant for cooling the fuel cell FC to release heat, so as to thereby achieve cooling.

The water pump WPa is a pump for circulating the coolant between the fuel cell FC and the main radiator RMa. With the operation of the water pump WPa, the coolant flows from the main radiator RMa to the fuel cell FC through a coolant onward path.

The fuel cell system FS has the controller ECU (output supply part) as an overall control means. The controller ECU is a computer system which includes a CPU, a ROM, a RAM, and input/output interfaces, and the controller ECU controls each part of the fuel cell system FS. For example, when receiving a start signal IG output from an ignition switch, the controller ECU starts the operation of the fuel cell system FS. The controller ECU then obtains the electric power required from the entire fuel cell system FS based on, for example, an accelerator opening degree signal ACC output from an acceleration sensor and a vehicle speed signal VC output from a vehicle speed sensor. The electric power required from the entire fuel cell system FS is the sum of the amount of electric power for vehicle travel and the amount of electric power for auxiliary apparatuses.

The electric power for auxiliary apparatuses includes the electric power consumed by in-vehicle auxiliary apparatuses (humidifier, air compressor, hydrogen pump, cooling-water circulation pump, etc.), the electric power consumed by apparatuses which are required for the travel of the vehicle (transmission, wheel control apparatus, steering gear, suspension, etc.), the electric power consumed by apparatuses provided inside the passenger compartment (air conditioner, lighting equipment, audio system, etc.), and the like.

The controller ECU determines the distribution ratio of the electrical power output from the fuel cell FC and the electric power output from the secondary battery BTa. The controller ECU controls the oxidant gas supply system ASS and the fuel gas supply system FSS so that the amount of electric power generated by the fuel cell FC matches a target electric power. The controller ECU also controls an FC voltage-increasing part FDC so as to thereby control the operating point (the output voltage and the output current) of the fuel cell FC.

In order to obtain a target torque in accordance with the degree of opening of the accelerator, for example, the controller ECU outputs, as switching commands, the alternating-current voltage command values for the respective U-, V- and W-phases to the traction inverter so as to thereby control the output torque and the rotation speed of the drive motor DMa. In addition, the controller ECU controls the cooling system CS so as to ensure the fuel cell FC has a suitable temperature.

In the fuel cell system FS according to the present embodiment, the controller ECU compares the required electric power with a predetermined value X and thereby determines whether to perform an intermittent operation or a normal operation. The predetermined value X is a threshold which is to be defined so that the power generation efficiency of the fuel cell system FS will not deteriorate. An intermittent operation mode is set if a comparison result indicates that the required electric power is equal to or lower than the predetermined value X, while a normal operation mode is set if the comparison result indicates that the required electric power exceeds the predetermined value X.

The intermittent operation mode is a mode in which the power generation by the fuel cell system FS is stopped so that the drive motor DMa is driven only by the secondary battery BTa. The normal operation mode is a mode in which the fuel cell system FS is operated to generate electric power so that the drive motor DMa is driven by the generated power. The secondary battery BTa may also be used together with the fuel cell system FS in the normal operation mode.

Figure 2:
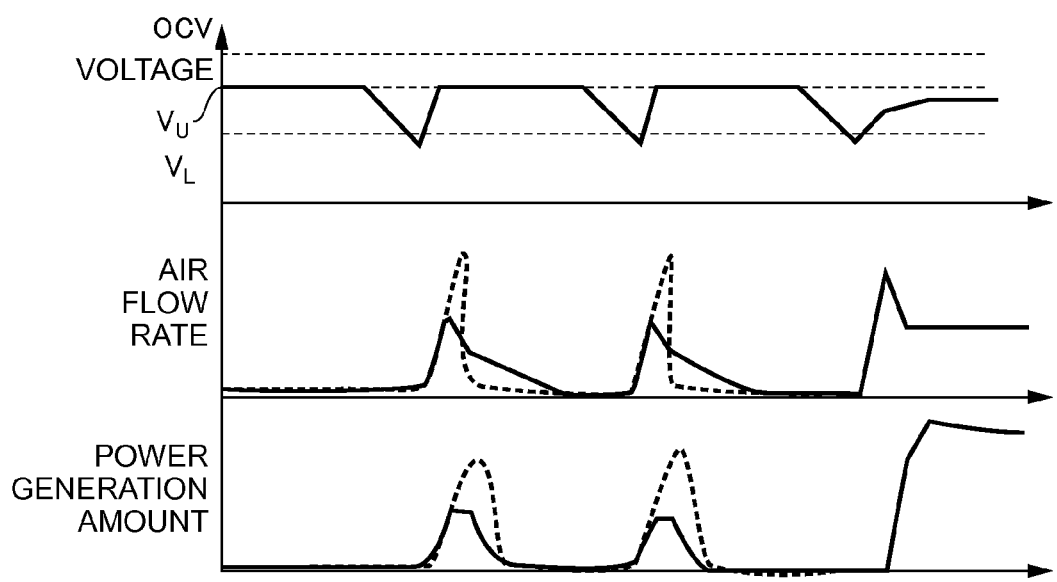
FIG. 2 is a timing chart for explaining the operating state of the fuel cell system shown in FIG. 1.

The controller ECU performs control as shown in FIG. 2 in the intermittent operation mode. The controller ECU monitors the output terminal voltage of the fuel cell FC, and the output terminal voltage of the fuel cell FC under the normal operation mode is controlled so as to be fixed to an upper limit voltage $V_U$, which is a high-potential avoidance voltage. When the normal operation mode is switched to the intermittent operation mode, the controlled output terminal voltage of the fuel cell FC starts decreasing gradually from the upper limit voltage $V_U$, i.e., the high-potential avoidance voltage. Here, the gradient of such downward voltage variation is measured as the rate of voltage decrease.

When the rate of voltage decrease is greater than a threshold rate, in order for the air serving as the oxidant gas to be supplied at a reduced flow rate per unit time and for a long time, the controller ECU performs control to cause the air compressor 62 to inertially rotate for a long time so as to exhibit the behavior shown by the solid line in FIG. 2. With this control, the interior of each cell in the fuel cell FC becomes dry and the rate of voltage decrease is reduced. More specifically, when the braking of the air compressor 62 is controlled without using regenerative braking equipment, etc., the period of inertial rotation of the air compressor 62 becomes longer than that in the case of using regenerative braking equipment, etc.

When the amount of air introduced into the fuel cell FC is the same, the amount of power generation and the amount of generated water increase if the air is introduced in a manner of introducing a large amount of air instantaneously. Accordingly, the rate of voltage decrease is increased if a large amount of air is introduced instantaneously, while the rate of voltage decrease is reduced if the air is introduced continuously.

On the other hand, if the rate of voltage decrease is slower than the threshold rate, in order for the air serving as the oxidant gas to be supplied at an increased flow rate per unit time and for a short time, the controller ECU performs control to forcibly stop the air compressor 62 so as to exhibit the behavior shown by the broken line in FIG. 2. More specifically, the air compressor 62 is forcibly stopped by using regenerative braking equipment, etc. With this control, the interior of each cell in the fuel cell FC becomes wet and the rate of voltage decrease is increased.

The upper and lower limit voltages for the output terminal voltage of the fuel cell FC are set as values for ensuring a sufficient output in the next load request. In such case, the manner in which the rate of voltage decrease is correlated with an output generated after the intermittent operation is stopped is examined in advance and the upper and lower limit voltages are set so that it is possible to obtain a required output value which is necessary in design. It should be noted that since the rate of voltage decrease may increase with an increase in the amount of gas permeation due to the degradation of membranes, etc., it is preferable to have a function of learning, during operation, the relationship between the rate of voltage decrease and an output generated after the intermittent operation.

If the rate of voltage decrease does not increase even after the air compressor 62 is forcibly stopped, it is preferable to reduce the upper limit voltage, i.e., the high-potential avoidance voltage, or to increase the amount of air provided. In addition, if it is necessary to suppress excess electric power because of the increase in the SOC of the secondary battery BTa or the Win limitation, the air compressor 62 is driven so as to reduce the amount of power generation during the intermittent operation. If the SOC of the secondary battery BTa reaches the upper limit thereof, it is also preferable to respond to such situation by temporarily increasing the above-described upper limit voltage.

Figure 3:
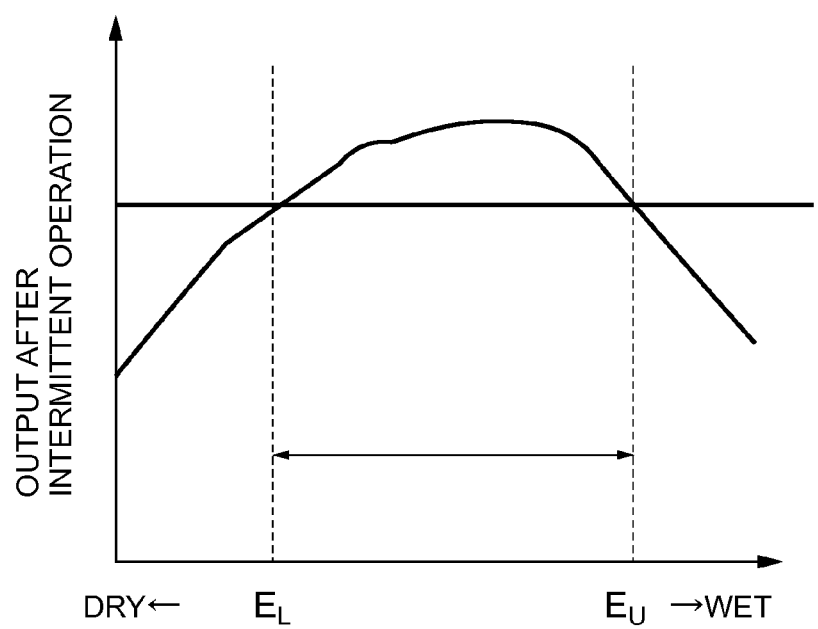
FIG. 3 is a graph showing the relationship between the rate of voltage decrease that should be maintained and an output obtained after an intermittent operation is ended.

By performing the above-described control, the rate of voltage decrease of the fuel cell FC during the intermittent operation can be held within the range of the rate of voltage decrease that should be maintained, as shown in FIG. 3. Since the rate of voltage decrease of the fuel cell FC can be held within the range of the rate of voltage decrease that should be maintained as shown in FIG. 3, namely, within the range from a lower limit rate $E_L$ to an upper limit rate $E_U$, it is possible to avoid an excessively dry condition or an excessively wet condition.

The rate of voltage decrease that should be maintained is analogous to the wet condition of the MEA that should be maintained. If the MEA is too dry, the hydrogen ion conductivity will deteriorate and the output of the fuel cell FC will decrease. If the MEA is too wet, the catalyst layer will be filled with moisture so that no gas can reach the electrode catalyst, and the output of the fuel cell FC will decrease. Thus, in order to maintain a favorable output after the intermittent operation, it is necessary to maintain an optimal moisture condition.

Figure 4:
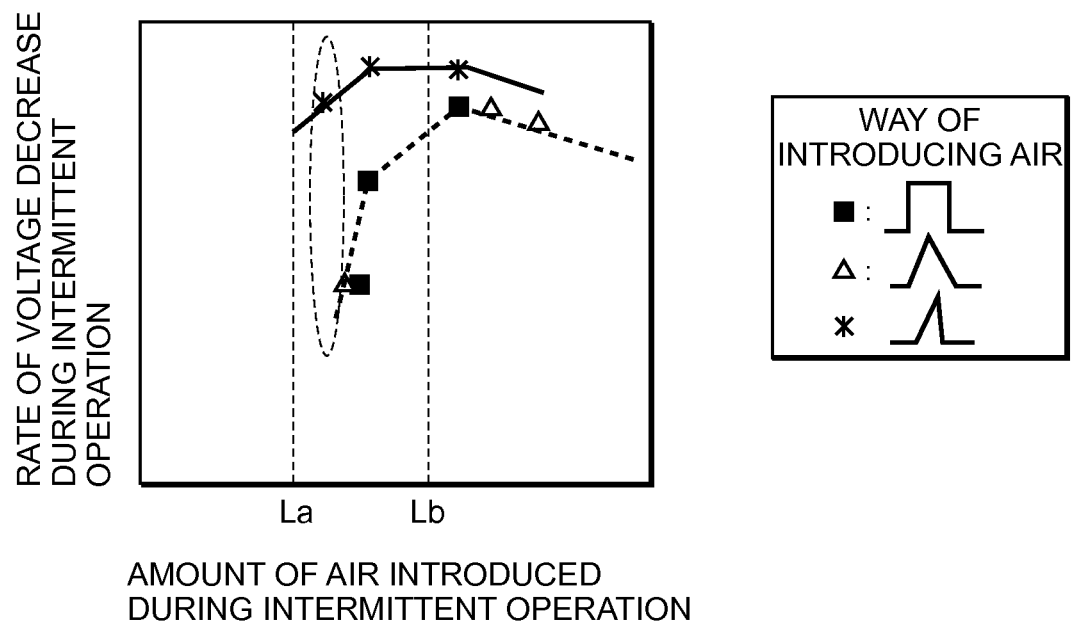
FIG. 4 is a graph showing the relationship between the amount of air introduced during an intermittent operation and the rate of voltage decrease during the intermittent operation.

The air blowing during the intermittent operation is performed so that the amount of introduced air falls within a range from a lower limit threshold La to an upper limit threshold Lb, as shown in FIG. 4. The lower limit threshold La is defined as a limit value to ensure that a voltage that has decreased to the lower limit voltage value can again increase to the upper limit voltage value. The upper limit threshold Lb is defined because a further increase of the amount of air will only result in an increase in the drive loss of an air compressor ACP. Usually, the air blowing is performed at a value close to the lower limit threshold La, as shown by area A.

Since the MEA tends to be dry if the temperature of the fuel cell FC increases and the MEA tends to be wet if the temperature of the fuel cell FC decreases, it is also preferable to operate the cooling system CS so as to regulate the temperature of the fuel cell FC and thereby control the wet condition.

In order to ensure the durability of the fuel cell stack, suppressing the catalyst degradation is an essential matter and maintaining the high-potential avoidance voltage is necessary. However, no load request is provided by the drive motor DMa during the intermittent operation, and excess electric power is thus absorbed by the secondary battery BTa or consumed to cover losses in the auxiliary apparatuses. However, there is a limit to the amount of power that can be absorbed by the secondary battery BTa, and in the case of consuming excess electric power by driving the auxiliary apparatuses, there is also a limit in the amount of electric power that can be consumed, considering the operational sounds thereof becoming too large. As a result, the high-potential avoidance voltage is raised if the excess electric power cannot be absorbed in the above-described ways, and this means that the durability of the fuel cell stack has to be sacrificed. In the present embodiment, however, the frequency of raising the high-potential avoidance voltage can be reduced and, accordingly, the present embodiment can suppress an excessively wet or dry state of the fuel cell stack and can thus ensure the durability of the fuel cell stack.

DESCRIPTION OF REFERENCE NUMERALS

62 Air compressor
69 Bypass flow path
92, 92 Wheel
AS1 Oxidant gas flow path
AS2 Oxidant off-gas flow path
ASS Oxidant gas supply system
BTa Secondary battery
CE Cell
CS Cooling system
DMa Drive motor
DVa Electromagnetic valve
DVb Integrated valve
ECU Controller
EVc Discharge/drain valve
FC Fuel cell
FCS Fuel cell unit
FDC Voltage-increasing part
FS Fuel cell system
FS1 High-pressure hydrogen tank
FS2 Fuel off-gas flow path
FSS Fuel gas supply system
HPa Hydrogen pump
HVs Drive system
Pt Pressure sensor
RMa Main radiator
Td Temperature sensor
Tf Temperature sensor
Tg Sensor
Th Temperature sensor
TVa Inlet three-way valve
WPa Water pump

What is claimed is:

1. A fuel cell system comprising:
a fuel cell stack including a plurality of unit cells, each having an anode and a cathode;
a fuel gas supply system comprising a fuel tank and a first valve that supplies a fuel gas to the anode;
an oxidant gas supply system comprising an air compressor and a second valve that supplies an oxidant gas to the cathode;
a state detection unit that is programmed to detect a dry/wet state of the unit cell; and
a control unit that is programmed to control the fuel gas supply system and the oxidant gas supply system so that power generation is performed by the fuel cell stack in response to a required electric power, and that is also programmed to control the fuel gas supply system and the oxidant gas supply system based on a result of detection by the state detection unit,
wherein, when the required electric power is equal to or lower than a predetermined value and when an intermittent operation is being performed in which the power generation by the fuel cell stack is suppressed, the control unit is programmed to monitor an output terminal voltage of the fuel cell stack so that the output terminal voltage has a value which is equal to or lower than an upper limit voltage for the intermittent operation and is equal to or greater than a lower limit voltage for the intermittent operation, and is programmed to supply the oxidant gas based on a result of the monitoring, and wherein the control unit is programmed to perform an output ensuring mode in which the oxidant gas is supplied with a reduced flow rate per unit time and for a long time period if the unit cell is determined as being in a wet state, while the oxidant gas is supplied with an increased flow rate per unit time and for a short time period if the unit cell is determined as being in a dry state.

2. The fuel cell system according to claim 1,
wherein the state detection unit is programmed to detect the dry/wet state of the unit cell by measuring a rate of voltage decrease, which is a rate of decrease of the output terminal voltage from the upper limit voltage to the lower limit voltage due to a shortage of oxygen, and
wherein the control unit is programmed to determine that the unit cell is in a dry state when the rate of voltage decrease is equal to or lower than a lower limit threshold rate and is programmed to determine that the unit cell is in a wet state when the rate of voltage decrease is equal to or greater than an upper limit threshold rate.

3. The fuel cell system according to claim 2,
wherein the control unit is programmed to learn the relationship between the rate of voltage decrease and an output of the fuel cell stack generated after the intermittent operation, and is programmed to change the threshold rate for the rate of voltage decrease.

4. The fuel cell system according to claim 2,
wherein the control unit is programmed to monitor transition of the rate of voltage decrease after the output ensuring mode starts being performed, and the control unit is programmed to correct the upper limit threshold downward if the rate of voltage decrease does not increase.

5. The fuel cell system according to claim 1,
wherein the control unit is programmed to cause the air compressor to rotate inertially for a long time if the unit cell is in a wet state, and is programmed to forcibly stop the air compressor if the unit cell is in a dry state.

6. A fuel cell system comprising:
a fuel cell stack including a plurality of unit cells, each having an anode and a cathode;
a fuel gas supply system comprising a fuel tank and a first valve that supplies a fuel gas to the anode;
an oxidant gas supply system comprising an air compressor and a second valve that supplies an oxidant gas to the cathode; and
a control unit that is programmed to control the fuel gas supply system and the oxidant gas supply system so that power generation is performed by the fuel cell stack in response to a required electric power,
wherein, when the required electric power is equal to or lower than a predetermined value and when an intermittent operation is being performed in which the power generation by the fuel cell stack is suppressed, the control unit is programmed to monitor an output terminal voltage of the fuel cell stack so that the output terminal voltage has a value which is equal to or lower than an upper limit voltage for the intermittent operation and is equal to or greater than a lower limit voltage for the intermittent operation, and is programmed to supply the oxidant gas based on a result of the monitoring,
wherein the control unit is programmed to measure a rate of voltage decrease, which is a rate of decrease of the output terminal voltage from the upper limit voltage to the lower limit voltage due to a shortage of oxygen, and wherein the control unit is programmed to supply the
oxidant gas with a reduced flow rate per unit time and
for a long time period if the rate of voltage decrease is
equal to or greater than an upper limit threshold rate,
and is programmed to supply the oxidant gas with an
increased flow rate per unit time and for a short time
period if the rate of voltage decrease is equal to or
lower than a lower limit threshold rate.

* * * * *